Dec. 27, 1955  R. A. BURGY ET AL  2,728,416
ELEVATOR CONTROL CIRCUITS
Filed April 8, 1953  2 Sheets-Sheet 1
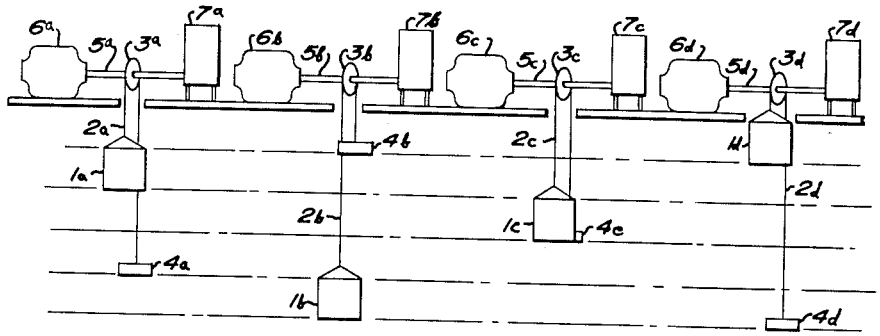
Fig. I
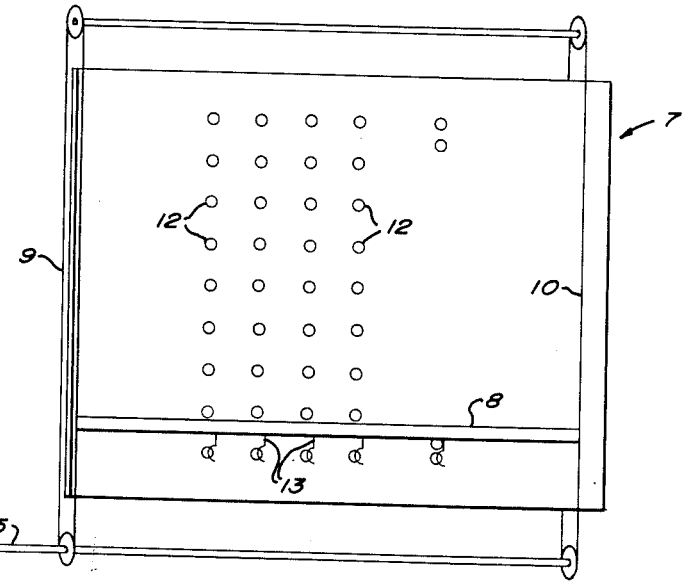
Fig. II
INVENTORS
RAYMOND A. BURGY
WALTER A. NIKAZY
BY
Marshall, Marshall & Hoasting
ATTORNEYS

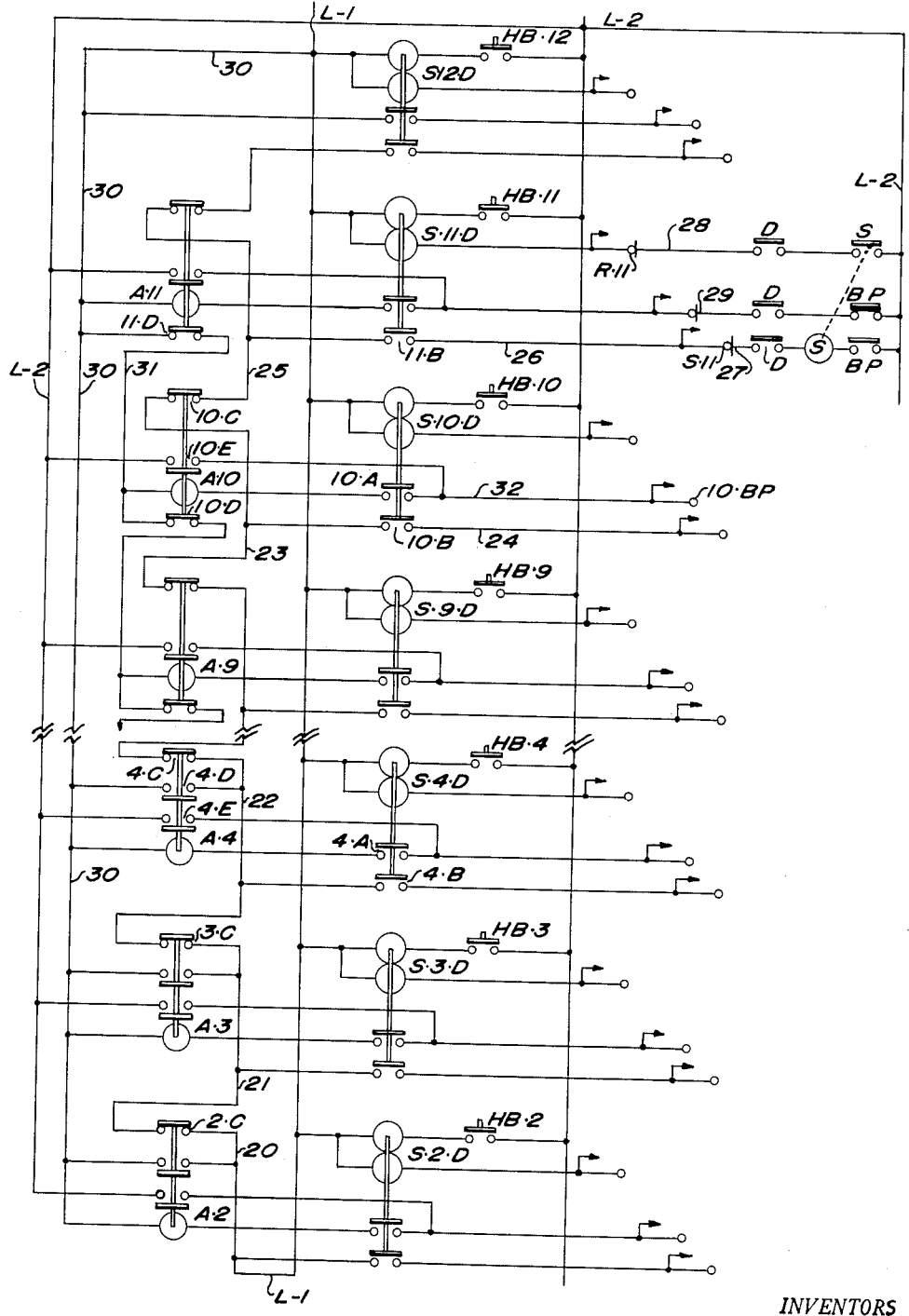

United States Patent Office 2,728,416
Patented Dec. 27, 1955

2,728,416

ELEVATOR CONTROL CIRCUITS

Raymond A. Burgy and Walter A. Nikazy, Toledo, Ohio, assignors to Haughton Elevator Company, Toledo, Ohio, a corporation of Ohio Application April 8, 1953, Serial No. 347,463

7 Claims. (Cl. 187—29)

This invention relates to elevator control systems and in particular to a control system that prevents certain floors or groups of floors from monopolizing the elevators during periods of heavy traffic.

Most elevators are equipped with means whereby they may be caused to bypass signals when traveling in either direction. These means, commonly called bypass switches, are provided so that a loaded car, for example one that becomes loaded at the upper floors of a building, may proceed directly to the lobby floor without stopping at intermediate floors where passengers may be waiting. It often happens in large office buildings that during down rush periods, when many people are leaving the building, that elevator cars become loaded at the upper floors and then bypass intermediate floors in traveling to the lobby. In this case a person on an intermediate floor may, in an extreme case, have to wait until most of the passengers on upper floors have been served before a car can stop to answer his call.

The principal object of this invention is to provide a simple control system that automatically determines when a car bypasses a floor at which a signal has been registered and which then conditions the controls so that a following car will bypass higher floor calls and proceed directly to the previously bypassed call. Thus, each car during its own down travel during rush periods, stops for calls at or below the point where the previous car became fully loaded. Thus, regardless of the floor on which a passenger might be he will be served in turn and will not have to wait until all of the passengers on higher floors have been served.

A still further object of the invention is to provide means that automatically conditions the control system that the next down traveling car answers the highest previously bypassed call and all calls from lower floors.

Another object of the invention is to provide a circuit whereby each call that is bypassed as a car travels downwardly will be signaled and a following car will bypass intermediate signals and answer only those which have previously been bypassed.

A still further object of the invention is to provide means whereby each elevator, operating in a normal manner, will reset the special control means so that any following down traveling car provides normal service.

Other objects and advantages will be apparent from the following description of a preferred embodiment of the invention.

According to the invention an auxiliary floor relay is provided on the control board for each of the down floor relays. This auxiliary floor relay is arranged to be energized and electrically sealed whenever, after a call is registered at that floor, an elevator passes that floor in a down direction without stopping for the call. When the auxiliary relay for a particular floor is energized it interrupts the flow of power to the stopping circuit contacts for all floors above and thus prevents stop signals from being answered by the next down traveling car. That car therefore, even though it does not have its by-pass switch thrown to bypass signals, nevertheless proceeds directly to the previously bypassed floor. When it arrives and stops at that floor in answer to a call at that floor it releases the auxiliary relay, so that normal service is then re-established for all floors above. The operation of an auxiliary relay does not cancel the calls for floors above but merely interrupts the stopping circuits so that the cars do not stop at those floors until the previously bypassed call has been answered.

A preferred embodiment of the invention is illustrated in the accompanying drawings.

In the drawings:

Figure I is a schematic or a diagrammatic representation of a bank of elevators that may be operated according to the invention.

Figure II shows a simplified front elevation of one of the floor selector mechanisms used with the elevators. There is one such floor selector mechanism for each elevator.

Figure III is a schematic wiring diagram showing only the down floor call registering relays, the auxiliary relays, and the stopping circuit for one elevator. It is to be understood that there is a floor selector relay and an auxiliary relay for each floor regardless of the number of floors in the building to be served or the number of elevators, and that there is a stopping circuit such as illustrated at the right in Figure III for each elevator regardless of the number of elevators in the bank.

Referring now to Figure I, showing several elevators of a bank, each of the elevators comprises a car 1 that is supported by a cable 2 carried over a drive sheave 3 and connected to a counterweight 4. Since the elevators are identical the same reference numerals will be used for each except the various cars and systems will be distinguished where necessary by separate letters such as A for the first car, B for the second, C for the third, and D for the fourth. The drive sheave 3 for each elevator is carried on a drive shaft 5 of elevator drive motor 6. The drive shaft 5 is also arranged to operate a floor selector mechanism 7.

Referring to Figure II, each of the floor selector mechanism 7 comprises or includes a carriage or bar 8 that is movable over the face of the floor selector mechanism and that is carried on a pair of chains 9 and 10. The chains are driven from a shaft 11, shown at the bottom of the figure, which is connected through gearing or a differential mechanism to the elevator drive shaft 5. A plurality of contacts 12 are arranged on the floor selector mechanism in vertical rows corresponding to the various functions that the elevator control must furnish there being one such row or lane for each function. The contacts are also arranged in horizontal rows or levels corresponding to the floors to be served by the elevator. The carriage 8 has a plurality of brushes 13, shown below the carriage that are adapted to wipe over the various contacts as the bar or carriage 8 is moved up and down the floor selector mechanism in step with the movement of the elevator in the hatchway. While only four such lanes of contacts are shown in the figure it is to be understood that many more are ordinarily required in a complete system.

Figure III shows only those portions of the elevator control circuits that are concerned with the stopping of the elevator to answer down signals and to show the auxiliary floor relays that are employed to give the preferential service to previously bypassed floors.

In the equipment shown in Figure III there is a floor selector relay for each of the floors these relays being marked or referred to as S2D, S3D, and etc. up to S12D. Each floor that is to receive preferential service in the event that a call registered at that floor is bypassed by a down traveling car is provided with an auxiliary relay these being referred to as A2, A3 etc. to A11. No auxiliary relay is provided for the top floor since it would never be bypassed. In addition to the relays, hall buttons are shown for each of the floors these being marked HB2, HB3 and etc. up to HB12.

The floor selector relays S2D through S12D are each of the latch relay type, i. e. they each have two coils, the upper coil being arranged to operate the latch to release the armature relay and allow it to drop to close its contacts and the other or lower coil of each being used to reset the relay to its latched condition when a circuit through the lower coil is completed as an elevator answers a call at that floor. Thus an intending passenger on the tenth floor desiring elevator service in the down direction pushes the push button HB10 which is a down button for that particular floor thereby completing a circuit from line L1 through the upper coil of the relay S10D, and the hall button HB10 to the return line L2. This unlatches the relay S10D allowing it to drop its armature and close its contacts 10A and 10B. Closure of the contacts 10B completes a circuit from the line L1 through a lead 20, normally closed contacts 2C of auxiliary relay A2, lead 21, normally closed contacts 3C of auxiliary relay A3, and lead 22, normally closed contacts 4C of auxiliary relay A4 and so on up to lead 23 connected to contacts 10B. From the contacts 10B the circuit continues through lead 24 to the contacts of the floor selector machines located in the lanes allocated to the stopping function at the tenth floor level. There is one such contact in each floor selector and they are connected in parallel to this last lead 24.

Likewise, if the intending passenger had been at the eleventh floor and had pushed the hall button HB11 at that floor he would have completed a circuit from the line L1 through the upper coil of the floor selector relay S11D and through the hall button back to the line L2 and thus caused this relay to drop its armature and close its contacts 11B. The closure of the contacts 11B would complete a circuit from the lead 23 through normally closed contacts 10C of the auxiliary relay A10 and lead 25 to the contacts 11B and from these contacts through a lead 26 to stopping contacts S11.

Assuming an elevator to be traveling in the down direction and to be arriving at the eleventh floor level, its selector brush 27, cooperating with the stop contacts completes a circuit from the now energized stop contact S11 through contacts down direction relays D and the stopping circuit indicated generally by the circle with a letter S. From the stopping circuit the circuit is completed to the line L2 through contacts BP of a bypass relay. Energization of this circuit initiates the stopping cycle of the elevator causing it to come to rest level with the eleventh floor. It should be noted that if the elevator were traveling in the up direction the D contacts would have been open and thus the stopping circuit would not have been energized. As the elevator stops in response to the stopping signal at the eleventh floor it closes its S contacts in the third line above the relay so as to complete a circuit from the line L1 through the lower coil of the latch relay S11D, a contact R11 of the reset lane of contacts, a lead 28, down direction relay contacts D, and the stopping circuit contacts S to the line L2. Current flow in this circuit relatches the relay S11D so as to open its contacts 11A and 11B.

Assuming now that the elevator became fully loaded at the eleventh floor, its bypass switch (manual or automatic) is operated, and a down call is still registered at the tenth floor. As the elevator proceeds downwardly its bypass set brush 29 contacts bypass point 10BP at the tenth floor level and thereby completes a circuit which may be traced from the line L1 through a lead 30, normally closed contacts 11D of the auxiliary relay A11, lead 31, operating coil of the relay A10, through the now closed contacts 10A of the latch S10D, a lead 32, the bypass contacts 10BP, the bypass set brush 29, and the now closed bypass relay contacts BP and down direction relay contacts D to the lead L2. Current flow through this circuit energizes the relay A10 so that it closes its contacts 10E thus completing a holding circuit from the lead 32 back through the contacts 10E to the line L2 on the left side of the diagram. It should be noted that this circuit is completed and the relay A10 energized only in case a hall call has been registered at the tenth floor and the elevator is passing the tenth floor with its bypass switch thrown.

When the relay A10 is energized it opens its contacts 10C and thereby breaks the circuit from the lead 23 to the lead 25 which it will be recalled feeds the stopping circuit for the eleventh floor stopping relay S11D and all the floors thereabove. Since there is no power to the B contacts of the floor selector relays above the tenth floor, the next down traveling car can receive no stopping signals and therefore passes these floors even though passengers may have registered down calls. When this car approaches the tenth floor, since it is operating in its normal manner with its bypass switch inoperative and since the stopping contacts 10B are energized it receives a stop signal and stops at the tenth floor. As it stops it resets or relatches the tenth floor stopping relay S10D. This relay by opening its contacts 10A de-energizes the auxiliary relay A10. This auxiliary relay thereupon recloses its contacts 10C and thus re-energizes the stopping circuits for the floors above so that normal operation will be resumed with the next down traveling car answering all down calls. The small arrows on the leads 24, 26, 32, etc. indicate that these leads go to the various floor selector machines and that the corresponding contacts on these floor selector machines are connected in parallel.

In reference to the diagram it will be noted that the stopping circuits for all of the floors are fed from the line L1 and lead 20 through normally closed contacts, arranged in series, of the auxiliary relays A2, A3, A4, etc. Thus operation of any one of these relays interrupts the stopping circuits for all of the floors above that point.

If each down traveling car that is bypassing signals were allowed to energize each corresponding auxiliary relay as it bypassed a hall call the next down traveling car would also bypass such calls until it reached the lowest one of such energized auxiliary relays. This is ordinarily undesirable because the next down traveling car should start to answer calls at the floor at which the previous car started to bypass these calls. Therefore the circuit for energizing the auxiliary relays is fed from the line L1 through the normally closed contacts 11D, 10D, etc. of the auxiliary relays starting at the top auxiliary relay and proceeding downwardly. Thus as soon as one of these auxiliary relays is operated the auxiliary relays below that floor will not be operated since the energizing circuit is broken.

It may be found desirable, particularly in large office buildings where executives have their offices on lower floors, to provide that should a down signal at one of these lower floors be bypassed the next down traveling car will bypass floors above even though those floors have signals which have previously been bypassed. In order to accomplish this the circuit for the lower floors differs from the upper floor circuits as is shown in the lower portion of Figure III. It will be noticed in this figure that for the floors 2, 3, and 4 the energization of the auxiliary relay takes place whenever a car bypasses that floor when a call has been registered at that floor. Thus, supposing that the hall button HB4 has been operated to unlatch relay S4D to close its contacts 4A and 4B. The next down traveling car that is bypassing signals and which bypasses this floor energizes the auxiliary relay A4 by current flow from the line L1 through the lead 30, through the operating coil of the relay A4, the now closed contacts 4A, and the bypass lane brush 29 of the elevator. Relay A4 thereupon closes its contacts 4D and opens its contacts 4C. Closure of the contacts 4D completes a bypass circuit from lead 30 directly to the lead 22 and hence through the new closed contacts 4B to the stopping contact S4 on the floor selector machines. Therefore, the next down traveling car that is not bypassing signals will stop at this floor. At the same time the relay A4 opens its contacts 4C thereby de-energizing the stopping circuits for all the floors above. The relay A4 also closed its contacts 4E so as to complete a holding circuit. It will be noticed that this holding circuit includes the contacts 4A of the floor selector relay S4D so that the relay A4 is de-energized as soon as a car answers the call at the fourth floor.

The important difference between the circuit as shown for the upper floors and the circuit as shown for the second to fourth floors lies in the manner in which the auxiliary relays are controlled. For the upper floors, as shown, only the first auxiliary relay to be bypassed is energized and the energization of that relay makes it impossible to energize any of the other relays below that floor which is controlled in that chain of relays. In contrast, the relays A2 to A4 inclusive, are arranged so that each is energized if a signal at the corresponding floor is bypassed by a down traveling car. The difference in operation resulting from this difference in wiring is that in the first case, for the upper floors, the next down traveling car will stop and answer the highest previously bypassed call and will then proceed to answer the remaining lower calls in their natural order. This follows because none of the auxiliary relays for these lower calls could be operated by the previous car as it bypassed those calls. In contrast the relays circuit for the lower floors A2 to A4 is such that each relay is energized as a car bypasses a call at that floor. Hence the next down traveling car will stop at the first such floor to be bypassed to answer that call and then to proceed to the next previous bypassed call to answer that one and so on down. Answering the highest of these previously bypassed calls does not restore normal operation for the remainder of the trip. Thus if a circuit is wired as shown for the floors 2 to 4 the second down traveling car, the first to follow the car that has previously bypassed signals, will answer only those signals which were registered prior to the down travel of the first car.

In this system of control, as shown for the upper or lower floors, the auxiliary relays are energized as soon as an elevator passes a previously registered call without answering that call. It does not matter whether the car actually stops at that floor or not. In the event that a car is filled at a stop without taking on all of the passengers awaiting at that floor, it is possible to cause the next down traveling car to bypass calls to that particular floor and pick up those passengers before proceeding on downwardly. This is accomplished if the remaining passengers left at that floor press their hall button again before the car leaves that floor. As soon as the operator throws the bypass switch indicating that he has received a capacity load he disconnects thereby the stopping circuit and through it, the reset circuit for the floor relay at that floor. This allows the floor relay to be unlatched again by the second operation of the hall button and since the car is now standing at that floor with its bypass switch thrown and the hall button relay operated to its unlatched position the auxiliary relay for that floor is energized thus establishing the circuit to cause the next down coming car to come directly to that floor. However, if the operator has taken on all of the passengers at that floor and has reached his capacity load he will operate his bypass switch as or after he leaves the floor. This does not affect the control because there are no remaining passengers to operate the hall button at that floor and consequently the first auxiliary relay to be operated is the one at the next lower floor at which a call is registered. As soon as that relay is energized the next down traveling car comes directly to that particular floor but ignores the floor at which the previous car received its full load.

It will be noticed from this type of operation that very efficient service is provided in that the next down traveling car that is following one which has previously bypassed a signal will proceed directly to that signal and thus start answering calls where the previous car became loaded. In this way the calls for service are served in the order in which they are reached provided the next previous car did not pass a signal. Any passed calls are given preferred service.

The circuits show two methods of accomplishing this. In one the control is arranged to answer the highest previously bypassed call and then continue on normal operation for the remainder of the trip. In a second arrangement each of the previously bypassed floor calls is identified and the next down traveling car proceeds from one bypassed signal to the next bypassed signal and ignores subsequently registered down calls between such previously bypassed calls. The latter system, shown for floors 2, 3 and 4, is particularly useful where certain floors are to be provided with preferential service in spite of previously bypassed calls on the higher floors. In fact as shown in the figure, the lower floors take preference over the upper floors in respect to bypassed signals because a car bypassing the fourth floor energizes the auxiliary relay A4 thus disconnecting or de-energizing the stopping circuits for all the floors above. In respect to the system for the lower floors each one, since it is tied directly to the power line as soon as it is operated, causes the stopping circuit to be completed for that floor regardless of the presence of bypass signals above or below that floor.

Various modifications may be made in the wiring diagrams or in the arrangement of the relays and their contacts without losing advantages of improved operation provided by causing each car that is following a loaded car which is bypassing the signals to proceed directly to the point at which the loaded car received its full load and then answer calls from that point on.

Having described the invention, we claim:

1. In a signal control for a bank of elevators, in combination, registering means common to all the elevators for registering floor calls, a floor selector machine for each elevator, a relay for each floor to receive preferential service, means for energizing the relay when the corresponding floor is to receive preferential service, means actuated when a relay is energized to prevent the energization of relays for floors beyond the floor corresponding to the energized relay, and means actuated when a relay is energized to interrupt the flow of current to the stopping circuits of the floor selector machines corresponding to the floors to be reached by a car before reaching the floor corresponding to the energized relay.

2. In a signal control for a bank of elevators, in combination, registering means common to all the elevators for registering floor calls, a floor selector machine for each elevator, a preferential relay for each floor to receive preferential service, means including contacts in the registering means for energizing the preferential relay for a floor to receive preferential service, contacts on the floor selector machines which when energized actuate stopping means for the elevators, a circuit for energizing said contacts, said circuit including contacts of the call registering means individually in series with the contacts for the respective floors, and contacts on said preferential relays which contacts when the relay is in non-preferential condition carry current to energize the stopping contacts for at least one floor behind the preferred floor, and means actuated by each preferential relay for preventing the energization of the preferential relays for floors ahead of the actuated preferential relay.

3. A signal control system according to claim 2 in which bypass circuits of each elevator is operatively connected to the preferential relays and adapted to condition the preferential relay for a signaled floor for preferential service if the car bypasses the floor.

4. A signal control system according to claim 2 including timers responsive to the registering of floor calls and operatively connected to energize the preferential relays at the expiration of predetermined time intervals.

5. A signal control system according to claim 2 including signaling means at each floor to be afforded preferential service for energizing the preferential relay for that floor.

6. In a signal control system for a bank of elevators, in combination, floor call registering means common to all the elevators of the bank, a floor selector machine for each elevator, a preferential service relay for each floor to receive preferential service, a circuit for energizing each preferential relay that includes signal contacts, contacts of the floor call registering means for the floor, and contacts of any preferential relay behind the relay to be energized, and means controlled by the preferential relay for interrupting the stopping circuits for floors behind the floor to receive preferential service.

7. A control system according to claim 6 in which the preferential relays are divided into groups and each preferential relay has contacts for interrupting the stopping circuits for floors corresponding to other preferential relays of the same group only.

References Cited in the file of this patent

UNITED STATES PATENTS 2,619,197    Glazer et al. _____ Nov. 25, 1952